(12) United States Patent
Knip et al.

(10) Patent No.: US 11,089,900 B2
(45) Date of Patent: Aug. 17, 2021

(54) ASSEMBLY AND METHOD FOR FROTHING MILK

(71) Applicant: Koninklijke Douwe Egberts B.V., Utrecht (NL)

(72) Inventors: Abram Christiaan Knip, Nieuw-Vennep (NL); Eduard Pater, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 0 days.

(21) Appl. No.: 16/122,782

(22) Filed: Sep. 5, 2018

(65) Prior Publication Data

US 2019/0000263 A1    Jan. 3, 2019

Related U.S. Application Data

(63) Continuation of application No. PCT/NL2017/050149, filed on Mar. 9, 2017.

(30) Foreign Application Priority Data

Mar. 9, 2016 (NL) .................................. 2016400

(51) Int. Cl.
*A47J 31/44* (2006.01)
*A23F 5/26* (2006.01)
(Continued)

(52) U.S. Cl.
CPC ............. *A47J 31/4485* (2013.01); *A23F 5/26* (2013.01); *A23L 2/54* (2013.01); *A47J 31/4489* (2013.01);
(Continued)

(58) Field of Classification Search
CPC .... A47J 31/4485; A47J 31/4489; A47J 31/44; A47J 31/60; A47J 31/52; A47J 31/41;
(Continued)

(56) References Cited

U.S. PATENT DOCUMENTS 8,357,416 B2    1/2013   Schindler et al.
10,898,024 B2   1/2021   Dees
(Continued)

FOREIGN PATENT DOCUMENTS

CN    101048096    10/2007
CN    101059267    10/2007
(Continued)

OTHER PUBLICATIONS

International Search Report and Written Opinion, PCT/NL2017/050149, Koninklijke Douwe Egberts B.V., 10 pages (dated Jun. 28, 2017).
(Continued)

*Primary Examiner* — Hong T Yoo
(74) *Attorney, Agent, or Firm* — Fitch, Even, Tabin & Flannery LLP

(57) ABSTRACT

An assembly for frothing milk, including an air supply assembly including an air channel having an air inlet and a downstream end. The assembly also includes a fluid channel extending from a fluid inlet to a fluid outlet. The fluid channel subsequently includes an air inlet emanation point to which the downstream end of the air channel is connected, a frothing unit including a pump and a flow-through heating unit. The flow-through heating unit bounds a heating unit fluid channel that is a part of the fluid channel and has a small thermal mass and a steep temperature profile.

13 Claims, 4 Drawing Sheets

(51) Int. Cl.
*A23L 2/54* (2006.01)
*A47J 31/52* (2006.01)
*F25D 25/00* (2006.01)

(52) U.S. Cl.
CPC ........... *A47J 31/52* (2013.01); *A23V 2002/00* (2013.01); *F25D 25/005* (2013.01)

(58) Field of Classification Search
CPC ......... A47J 31/46; A47J 27/004; A47J 31/40; A47J 31/468; A23F 5/26; A23L 2/54; A23C 9/00; A23C 9/1524
See application file for complete search history.

(56) References Cited

U.S. PATENT DOCUMENTS

| | | |
|---|---|---|
| 2004/0107843 A1 | 6/2004 | Oldani |
| 2004/0118291 A1 | 6/2004 | Carhuff |
| 2005/0233043 A1 | 10/2005 | Dirren |
| 2006/0045942 A1 | 3/2006 | Sher |
| 2006/0175351 A1 | 8/2006 | Reddy |
| 2008/0093382 A1 | 4/2008 | Sher |
| 2009/0011110 A1 | 1/2009 | Gotlenboth |
| 2009/0038655 A1 | 2/2009 | Coccia |
| 2009/0293733 A1 | 12/2009 | Martin |
| 2010/0047406 A1 | 2/2010 | Reyhanloo |
| 2010/0075007 A1 | 3/2010 | Schindler |
| 2010/0147158 A1 | 6/2010 | Muller |
| 2011/0049187 A1 | 3/2011 | Boekhoorn |
| 2011/0070349 A1 | 3/2011 | Burri |
| 2011/0083561 A1 | 4/2011 | Douma |
| 2011/0094541 A1 | 4/2011 | Douma |
| 2011/0192287 A1 | 8/2011 | Riessbeck |
| 2011/0232501 A1 | 9/2011 | Kroesen |
| 2011/0256289 A1 | 10/2011 | Steiner |
| 2013/0032036 A1 | 2/2013 | Zhong |
| 2013/0075939 A1 | 3/2013 | Noordhuis |
| 2013/0145936 A1 | 6/2013 | Dollner |
| 2013/0209639 A1 | 8/2013 | Larson |
| 2013/0276636 A1 | 10/2013 | Rithener |
| 2015/0150408 A1 | 6/2015 | Schlee |
| 2016/0051083 A1 | 2/2016 | Turi |
| 2018/0084940 A1 | 3/2018 | White |
| 2019/0069713 A1 | 3/2019 | Dees |
| 2019/0365144 A1 | 12/2019 | Upston |

FOREIGN PATENT DOCUMENTS

| | | |
|---|---|---|
| CN | 102144892 | 8/2011 |
| CN | 202198441 | 4/2012 |
| CN | 102946774 | 2/2013 |
| CN | 205018844 | 2/2016 |
| DE | 102010010516 | 9/2011 |
| DE | 202012009076 | 1/2013 |
| DE | 20 2012 009 074 | 3/2013 |
| EP | 0 485 350 | 5/1992 |
| EP | 0997093 | 5/2000 |
| EP | 2 120 656 B1 | 11/2009 |
| EP | 2 294 952 | 3/2011 |
| EP | 2534986 | 12/2012 |
| EP | 2 987 435 | 2/2016 |
| JP | 2013116215 | 6/2013 |
| WO | WO-2008/083941 A1 | 7/2008 |
| WO | WO-2008/120991 A1 | 10/2008 |
| WO | 2008139205 | 11/2008 |
| WO | 2010044116 | 4/2010 |
| WO | 2012083194 | 6/2012 |
| WO | 2013012882 | 1/2013 |
| WO | 2013078379 | 5/2013 |
| WO | 2017155400 | 9/2017 |
| WO | 2017155401 | 9/2017 |
| WO | WO-2017/155403 | 9/2017 |

OTHER PUBLICATIONS

87. Ferro Techniek's "FTH mk2" website, available at http://www.ferrotechniek.com/thick_film_heaters/produds/fth_mk2.aspx(Dec. 6, 2015, retrieved on eb.archive.org) (Year: 2015).
International Search Report and Written Opinion dated Jun. 28, 2017, International Application No. PCT/NL2017/050146 (10 pgs.).
International Search Report and Written Opinion dated Jun. 30, 2017, International Application No. PCT/NL2017/050147 (8 pgs.).
Search Report dated Apr. 17, 2020 for Chinese Application No. 201780012724.X (2 pgs.).

ASSEMBLY AND METHOD FOR FROTHING MILK

CROSS-REFERENCE TO RELATED APPLICATIONS

This application is a continuation of PCT/NL2017/050149, filed Mar. 9, 2017, which claims the benefit of and priority to Netherlands Application No. 2016400, filed Mar. 9, 2016, the entire contents of all of which are hereby incorporated herein by reference.

BACKGROUND

The invention relates to an assembly and a method for frothing milk.

Devices for frothing liquids, such as milk, are known in the art, such as for example EP 0.485.350 A1 or WO2008/083941A1 which matured into EP 2.120.656 B1. EP 2.120.656 B1 discloses a device for the production of milk foam of milk-based drinks. The device comprises a container containing cold milk that is to be provided to the device for frothing, and a pump that may be brought in fluid connection with the container by a milk conduit, so that cold milk can be drawn from the container to the pump. The device also comprises an air conduit with an air inlet and an air outlet, the latter of which emanates in the milk conduit. The device furthermore comprises a valve assembly that is configured to supply an amount of air to the fluid channel to form the fluid/air-mixture. The pump is connected to a fluid restriction for frothing the milk/air-mixture that is supplied to the fluid restriction by the pump. Downstream of the fluid restriction a valve assembly is installed in the milk conduit. A downstream side of the valve assembly is connected to two parallel milk conduits. In a first state of the valve assembly, the frothed milk is delivered to and dispensed from the milk outlet via the first of the two milk outlet conduits. In the second state of the valve assembly, the frothed milk is led through the second of the two parallel milk conduits, which conduit includes a flow-through heater to heat the frothed milk before it is delivered to and dispensed from the milk outlet.

A disadvantage of the device of EP'656 is that the subsequent dispensing of hot and cold frothed milk by the device in a relatively short period of time is only possible by virtue of the two parallel milk conduits. When a single milk conduit including a flow-through heater would be used, cold frothed milk that is dispensed shortly after dispensing hot frothed milk is warmed up by residual heat of the heater due to the fact that the heater has a relatively long cool-down period. As a result, the known device has a relatively complex construction in order to subsequently provide both hot and cold frothed milk in a short period of time. The valve assembly for switching between the two parallel channels is vulnerable for contamination and bacterial growth.

SUMMARY

The invention is aimed at providing an assembly for producing hot and cold frothed milk relatively shortly after each other wherein the disadvantages of the known frothing assembly are alleviated. To that end, provides an assembly comprising:
an air supply assembly including an air source and an air channel having an air inlet and a downstream end, the air source being connected to the air inlet;
a fluid channel extending from a fluid inlet to a fluid outlet, the fluid channel subsequently including:
an air inlet emanation point to which the downstream end of the air channel is connected;
a frothing unit including a pump; and
a flow-through heating unit that bounds a heating unit fluid channel that is a part of the fluid channel, wherein the flow-through heating unit has a powered state and a non-powered state, wherein the flow-through heating unit has a thermal mass which is so small that, when the heating unit is in the non-powered state, frothed milk, in particular an amount of 40-60 ml frothed milk with a temperature of less than 7° C. at the fluid inlet, remains below a relatively low temperature, in particular below 20° C., even when it has passed through the flow-through heating unit fluid channel only a few seconds, in particular only 10 s, after the flow-through heating unit has been switched from the powered state for producing hot frothed milk to the non-powered state for producing cold frothed milk.

In this context, a relatively low temperature is a temperature of less than 20° C. when the temperature of the milk at the fluid inlet is less than 7° C. and when approximately 40-60 ml of milk is frothed. In this context, "a few seconds" means approximately 10 seconds. Consequently, the last feature of the claim 1 can be replaced by and should be interpreted as follows:
wherein the flow-through heating unit has a thermal mass which is so small that, when the heating unit is in the non-powered state, an amount of 40-60 ml frothed milk with a temperature of less than 7° C. at the fluid inlet remains below a relatively low temperature of 20° C. even when it has passed through the flow-through heating unit fluid channel only 10 seconds after the flow-through heating unit has been switched from the powered state for producing hot frothed milk to the non-powered state for producing cold frothed milk.

The application of a flow-through heating unit with the small thermal mass as defined in claim 1 in a frothing assembly for frothing milk according to the invention is surprisingly advantageous.

The flow-through heating unit with the small thermal mass as defined in claim 1 may be embodied as a thick-film-flow-through heating unit. The internal fluid channel of the thick-film-flow-through heating unit can be embodied to be very smooth and without any dead cavities. From a hygienic point of view this is very advantageous.

First of all, the assembly according to the invention has the advantage that only a single fluid line between the frothing unit and the fluid channel outlet is required, instead of two parallel milk lines to subsequently provide cold and hot frothed milk in a relatively short period of time. This is possible because the thermal mass of the flow-through heating unit is small. In the embodiment of a thick-film-flow-through heating unit the thermal mass may be very small. As a result, after being electrically powered the heating unit will very quickly raise in temperature for producing hot frothed milk. Subsequently, the temperature of the flow-through heating unit will go down very quickly when the electric power supply to the heating unit is switched off.

Additionally, extensive testing has revealed that the quality of the frothed milk is very good both when producing cold frothed milk as well as when producing hot frothed milk. The stability of the foam quality of the frothed milk is in both cases very good.

By virtue of the fact that no parallel fluid lines nor a switch valve to selectively direct the foamed milk through one of the two parallel lines are necessary, the assembly according to the invention requires less components, leading to a reduced complexity, and is more energy efficient than the known frothing assemblies. Additionally, the risk of contamination is reduced relative to the known frothing unit with the two parallel fluid channels and the switch valve because the fluid channel can be relatively smooth with no dead cavities. These dead cavities are in many cases present in switch valves and often form a source of contamination.

These advantages are achieved by virtue of the low thermal mass of the flow-through heating unit as defined in claim 1, which results in steep temperature profiles both when switched on and switched off. A flow-through heating unit having these characteristics may be embodied as a thick-film-flow-through heating unit.

These characteristics firstly allow for a relatively rapid heating of a flow of frothed milk through the heating unit, which obviates a standby mode of the heating unit of the prior art in which the heating element in one of the parallel fluid lines is continually at least partially heated. Not only does this reduce the energy consumption of the assembly, it also allows cold frothed milk to flow through the heating unit before being dispensed from the fluid channel outlet without the cold milk being heated.

Secondly, the fact that a standby mode is not required and the fact that the cool-down period of the heating unit is relatively short, makes it possible to allow a flow of cold frothed milk to be pumped through the heating unit shortly after dispensing hot frothed milk without incurring the risk of the cold milk being heated up by residual heat from the heating unit.

It should be noted that a thick-film-flow-through heater is known per se and is for example marketed by Ferrotechniek B.V. (see www.ferrotechniek.nl). An application of a thick-film-flow-through heating unit for preparing hot water is disclosed in WO2008/1200991 A1.

The invention also provides a refrigerator including:
a housing bounding a refrigerator space, the housing including a door that has an open position, in which the refrigerator space is accessible via a door opening, and a closed position for closing off the door opening; and
the assembly for frothing milk according to the invention, wherein the major components of the assembly, including the frothing unit and the flow-through heating unit are positioned in the refrigerator space.

A refrigerator including an assembly according to the invention has the advantage that a milk frothing assembly can be provided to users with a conventional coffee apparatus that does not include a milk frothing assembly. In an embodiment, the refrigerator can be coupled to a coffee machine or even integrated in a coffee machine.

Another advantage of the refrigerator is that the thick-film-flow-through heating unit does not require a standby mode, in which the element is heated, but is switched off between subsequent dispensings of (hot) frothed milk. As a result, less heat is generated within the refrigerator, which increases the energy efficiency of a milk frothing assembly that is provided in a refrigerator. Additionally, by virtue of the fact that the heating unit is positioned in the refrigerator space, the cooling down of the heating unit after being switched off is promoted by the relatively cold environment of the heating unit. This is beneficial when cold frothed milk has to be produced immediately after hot frothed milk has been produced. Finally, the hygienic circumstances within the fluid channel including its various components are promoted because of the relatively cold environment within the refrigerator space.

The invention further comprises a system for making coffee, comprising:
an apparatus for providing coffee to a user; and
an assembly according to the invention, or the refrigerator according to the invention;
wherein the coffee apparatus and the assembly are connected to form an integrated unit that is provided with an integrated electronic control system that is operable by means of a user interface that is provided on the coffee apparatus.

The assembly or the refrigerator according to the assembly can advantageously be combined with a variety of existing apparatus for making coffee, especially apparatus without a milk frothing unit, thus allowing the dispensing of coffee including frothed milk such as cappuccino or latte macchiato.

Furthermore, the invention provides a method for producing frothed milk, comprising:
providing an assembly or a refrigerator according to the invention;
activating the pump to create a flow of milk in the fluid channel;
supplying a flow of air to the milk in the fluid channel;
mixing the flow of milk and the flow of air to form a milk/air-mixture;
frothing the milk/air mixture in the frothing unit to form frothed milk;
selectively heating or not heating the frothed milk by the flow-through heating unit;
dispensing the frothed milk via the fluid outlet.

The method according to the invention has the advantage that the milk in the fluid line can selectively be heated, for example based on user-generated input such as the choice for a particular type of frothed milk. The method does not require parallel lines and switching valves to direct the frothed milk via one of the parallel lines to produce either hot frothed milk or cold frothed milk as is the case in the prior art frothing unit with a flow-through heating unit. The low thermal mass of, and the steep heating profile that can be produced with a flow-through heating unit with a small thermal mass provides the possibility to direct all the frothed milk that is produced through the heating unit channel and requires just selectively switching on or off of the power supply to the flow-through heating unit to produce hot frothed milk or alternatively cold frothed milk. This method can very well be executed with an assembly in which the flow-through heating unit is embodied as a thick-film-flow-through heating unit.

Finally, the invention is directed to the use of a thick-film-flow-through heating unit in an assembly for producing frothed milk, the assembly comprising a fluid channel including a frothing unit that is positioned upstream of the thick-film-flow-through heating unit which is also included in the fluid channel, the thick-film-through-flow heating unit comprising a thick-film heating element, wherein the thick-film-flow-through heating unit bounds a heating unit fluid channel that is a part of the fluid channel (16) of the assembly, wherein a frothed milk/air-mixture is directed through the heating unit fluid channel and is selectively heated or not heated respectively by supplying electric power or by not supplying electric power to the thick-film-flow-through heating unit.

The advantages of using a thick-film-flow-through heating unit for producing frothed milk are similar to the advantages of the frothing assembly according to the invention which have been described above and to which reference is made.

Various embodiments are claimed in the dependent claims, which will be further elucidated with reference to an example shown in the figures. The embodiments may be combined or may be applied separately from each other.

DETAILED DESCRIPTION

Figure 1:
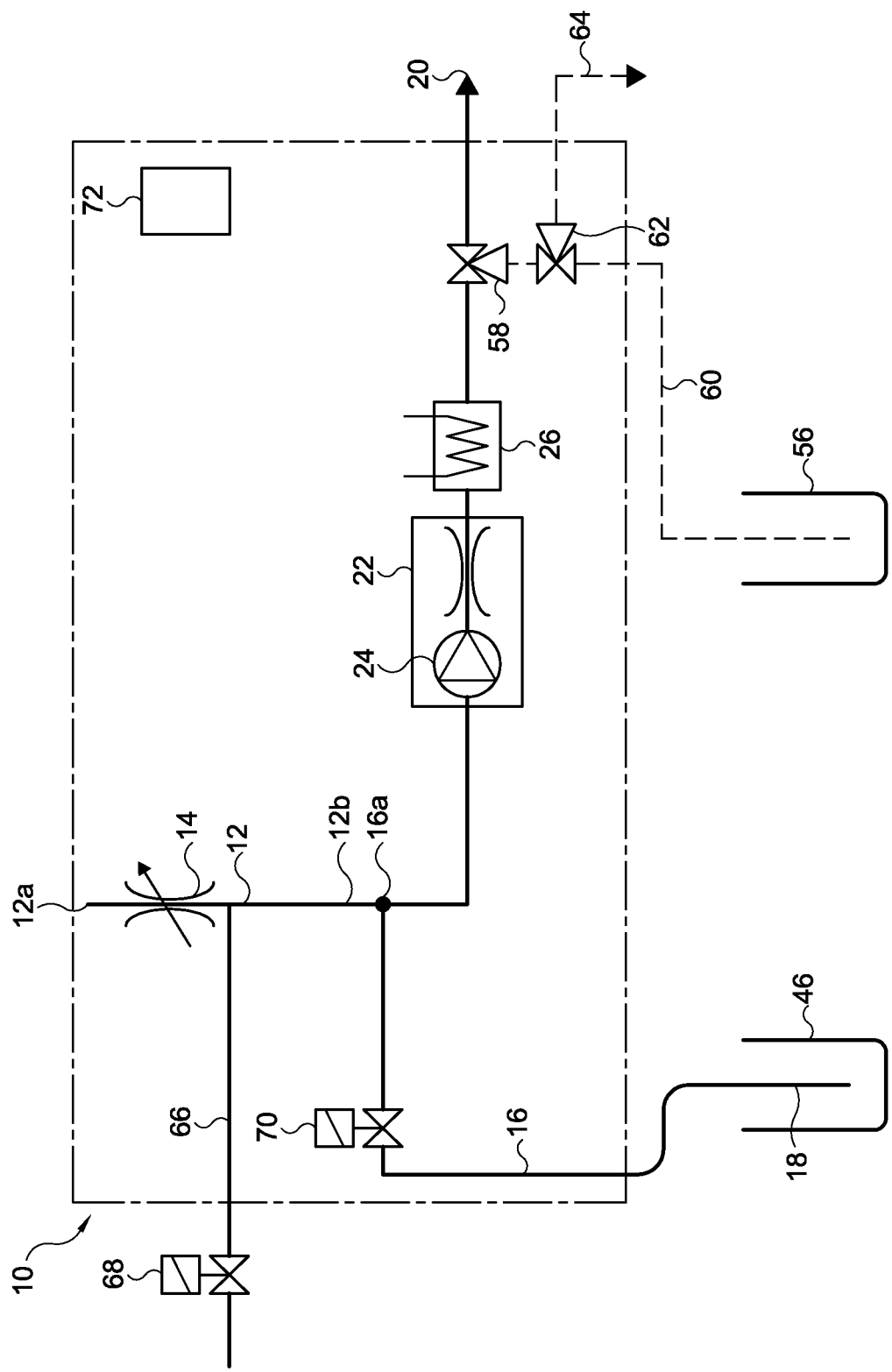
FIG. 1 shows a schematic view of an example of an assembly for frothing milk.

In most general terms, the assembly for frothing milk 10 includes an air supply assembly including an air source and an air channel 12 having an air inlet 12a and a downstream end 12b. The air source is connected to the air inlet 12a. In an embodiment the air supply assembly may be configured to control the flow of air that is supplied to the downstream end. This may be effect by an air pump that is connected to the air inlet 12a and that may produce a variable flow or by a controllable air valve 14 that may be mounted in the air channel 12. The assembly 10 further includes a fluid channel 16 that extends from a fluid inlet 18 to a fluid outlet 20. The fluid channel 16 subsequently includes an air inlet emanation point 16a to which the downstream end of the air channel 12b is connected, a frothing unit 22 including a pump 24 and a flow-through heating unit 26 that bounds a heating unit fluid channel 30 that is a part of the fluid channel 16. The flow-through heating unit 26 has a powered state and a non-powered state. The flow-through heating unit 26 has a thermal mass which is so small that, when the heating unit 26 is in the non-powered state, frothed milk remains below a relatively low temperature even when it has passed through the flow-through heating unit fluid channel 30 only a few seconds after the flow-through heating unit 26 has been switched from the powered state for producing hot frothed milk to the non-powered state for producing cold frothed milk. Typically, the thermal mass is so small that when the heating unit 26 is in the non-powered state, an amount of 40-60 ml frothed milk with a temperature of less than 7° C. remains below a relatively low temperature of 20° C. even when it has passed through the flow through heating unit fluid channel 30 only 10 seconds after the flow-through heating unit 26 has been switched from the powered state for producing hot frothed milk to the non-powered state for producing cold frothed milk.

The advantages of the assembly according to the invention have been provided in the summary, to which reference is made here.

In an embodiment, flow-through heating unit 26 may be a thick-film-flow-through heating unit 26 that includes a thick-film heating element 28. The thick-film-flow-through heating unit 26 bounds the heating unit fluid channel 30 (see FIG. 4) that is a part of the fluid channel 16.

Figure 4:
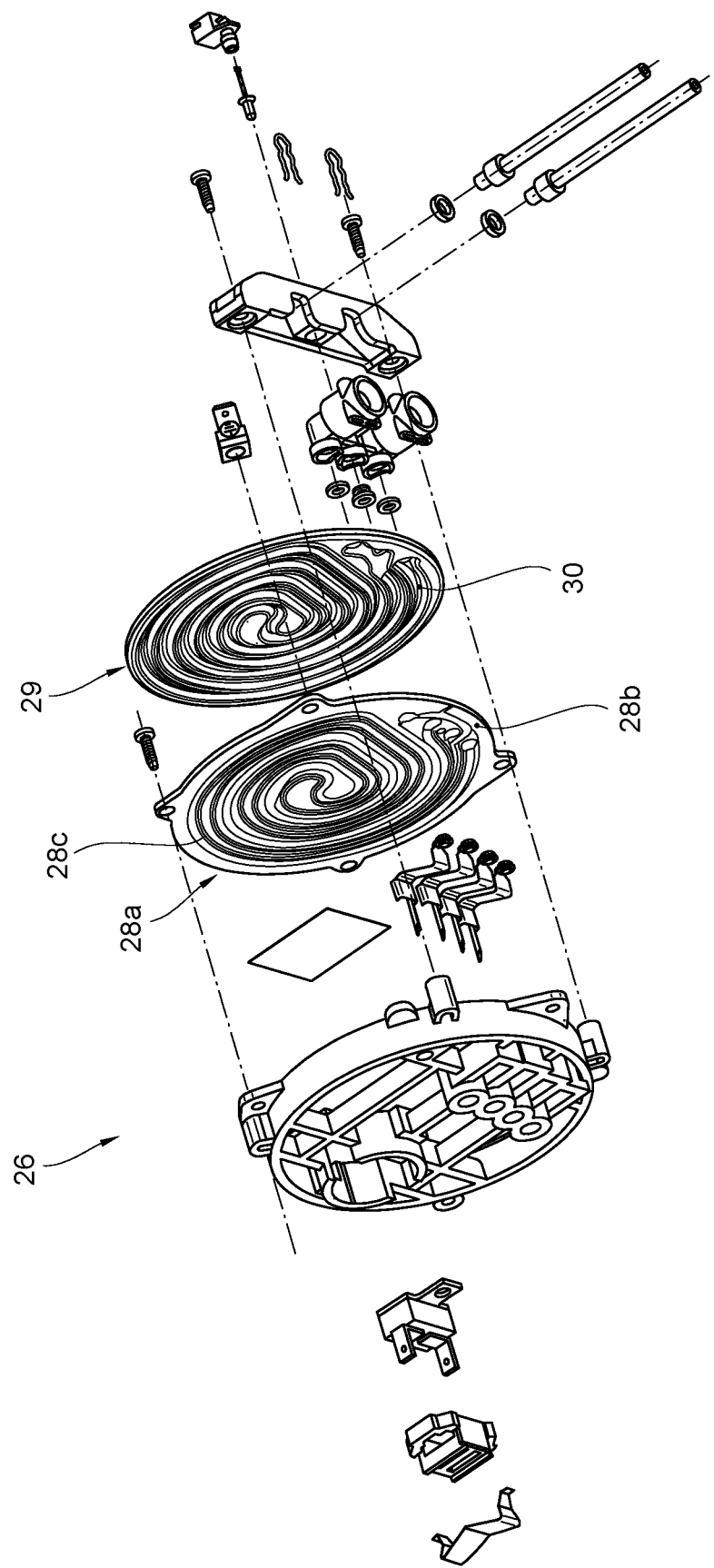
FIG. 4 shows an exploded view of the thick-film-flow-through heating unit of FIG. 3.

Thick-film-flow-through heating units may have a very low thermal mass and therefore may have a very steep temperature profile both when switched on as well as when switched off. In an embodiment, an example of which is shown in FIG. 4, the thick-film heating element 28 may include a metal heat conductive plate 28a, which on a first side is coated with a di-electric coating 28b on which a track of electrically conductive material 28c is applied. The track of electrically conductive material 28c has an electrical resistance so that heat may be generated by the track 28c when an electric current flows through the track of electrically conductive material 28c.

By manufacturing the thick-film heating element 28 as a metal, heat conductive plate 28a to which a di-electric coating 28b and a track of electrically conductive material 28c are applied, a compact and efficient heating element 28 can be obtained. The thick-film heating element 28 has a small thermal mass and a relatively short response time, which results in a steep temperature profile. FIG. 4 shows an exploded view of an example of a thick-film-flow-through heating unit 26 in which the thick film heating element 28 and the layers 28a, 28b, 28c according to this embodiment are clearly visible.

In a further elaboration of this embodiment, the thick-film-flow-through heating unit 26 may include a second plate 29 that is connected with a contact side thereof to a second side of the metal plate 28a. The second plate 29 includes a channel structure that has an open side at the contact side. The first plate 28a closes off the open side of the channel structure so as to bound the heating unit fluid channel 30.

This embodiment has the advantage that, by virtue of the connection between the metal, heat conductive plate 28a and the second plate 29 with a channel structure, a relative simple and robust heating unit 26 can be provided. For the application in a milk frothing assembly, the materials should be chosen such that the heating unit 26, more specifically the channel structure through which the milk is pumped, is approved for food processing.

Several manufacturing techniques may be used to apply the channel structure to the second plate 29, such as for example milling, punching or deforming. The second plate 29 may also be produced in a casting process. Also, the channel structure may be applied during manufacturing of the second plate 29, thus providing a plate with a preformed channel structure. In addition, the connection between the metal, heat conductive plate 28a and the second plate 29 may be formed using any suitable technique, such as for example welding. By virtue of the fact that the metal heat conductive plate 28a directly bounds the heating unit fluid channel 30, a direct contact between the frothed milk and the metal heat conductive plate 28a is provided which leads to a very efficient transfer of heat from the heat conductive plate 28a to the frothed milk is affected.

In an embodiment the assembly may comprise an electronic controller assembly 72 controlling the heating unit 26 in response to at least a user-generated instruction.

The assembly 10 may comprise an electronic controller assembly 72 to perform a variety of functions, such as for example control of the heating unit. A user may, for example by means of a graphical user interface (GUI) or another type of interface, select a drink from a menu, for example a cup of dry, hot frothed milk. The electronic controller assembly 72 is configured to control the heating unit 26 in order to regulate an amount of heat that is transferred to the milk in the heating unit fluid channel for providing the requested drink, which may for example be dry hot frothed milk, dry cold frothed milk, wet hot frothed milk, wet cold frothed milk, etc. The assembly 10 and the electronic controller assembly 72 may be configured to provide only a limited amount of user-generated input, for example choosing between hot and cold frothed milk, but may also be configured to provide a user with more sophisticated control options, such as for example a temperature control to select a specific output temperature or a selection module that allows a user to select the temperature and the type of frothed milk to be provided (for example wet/dry frothed milk).

Figure 3:
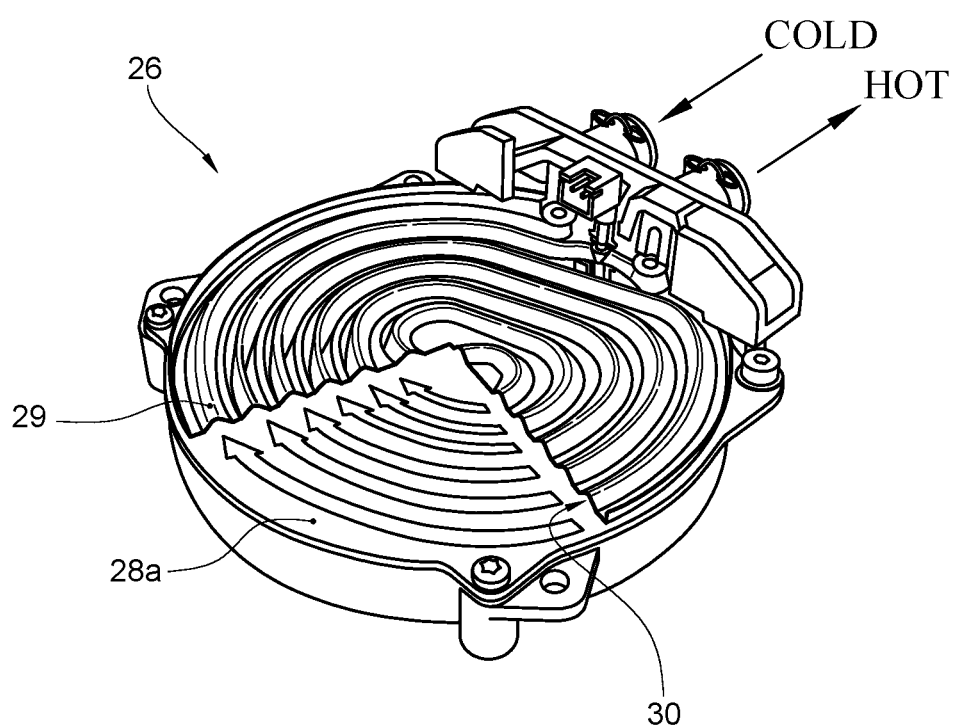
FIG. 3 shows a perspective view of an example of a thick-film-flow-through heating unit.

In an embodiment, an example of which is shown in FIGS. 3 and 4, the heating unit fluid channel 30 has a meandering and/or spiral-shaped configuration.

Such a meandering and/or spiral shaped configuration firstly has the advantage that the length of the heating unit fluid channel 30 may be relatively long so that the time available for heating the milk is rather long and, by consequence, a higher end temperature can be produced. Secondly, the space needed for a heating unit fluid channel 30 of a certain length can be kept relatively small.

In an embodiment, the thick-film-flow-through heating unit 26 may have a power output P that is between 800 W and 2,400 W. Preferably the thick-film-flow-through heating unit 26 may have a power output P that is between 1,500 W and 2,100 W. Even more preferably the thick-film-flow-through heating unit 26 may have a power output P that is approximately 1,800 W.

The selection of the power output P provided by the thick-film-flow-through heating unit 26 is an important factor in the maximum flow that can be heated by the heating unit 26 to a specific temperature. The power output P is also important for the speed with which a specific temperature of the heating element 28 can be achieved. Tests have shown that a power output P of approximately 1,800 W is a preferable output for a fluid frothing assembly according to the invention. However, a different power output, especially a higher power output, may be provided for the heating unit 26. A higher output P is for example preferred for milk frothing assemblies that have a high flow-rate and/or require very short response times.

In an embodiment, the assembly may comprise a fluid reservoir 46 for holding milk to be frothed. The fluid inlet 18 may be removably inserted in or may at least be removably connected to the fluid reservoir 46.

The assembly 10 may be provided with a fluid reservoir 46 that is a preformed, reusable fluid reservoir 46 and that can be refilled with milk after it has been depleted. However, in a more preferable embodiment, the fluid reservoir 46 may be a replaceable standard milk reservoir, such as a milk carton, a milk bottle or a plastic milk container that is connected to the fluid inlet 18 of the milk frothing assembly or in which the fluid inlet 18 is inserted. This obviates the use of cleaning the milk reservoir and reduces the downtime of the assembly. Once a milk reservoir 46, for example a milk carton, is empty, it can easily be replaced without having to clean the reservoir 46.

In addition, the use of replaceable standard milk reservoirs such as milk cartons in the assembly 10 may be advantageous with regard to the cleaning process. The assembly 10 can be cleaned at any time by temporarily disconnecting or removing the fluid inlet 18 from the milk reservoir 46 and connecting or inserting the fluid inlet 18 into a cleaning fluid reservoir 56. In an embodiment, the assembly may include a first three-way valve assembly 58 disposed in the fluid channel 16 downstream of the flow-through heating unit. The first three-way valve assembly 58 has an inlet that connects the first three-way valve 58 via the fluid channel 16 to the flow-through heating unit 26. The first three-way valve also has a first outlet and a second outlet. The first outlet connects the first three-way valve 58 to the fluid outlet 20 of the fluid channel 16. The second outlet connects the first three-way 58 valve to a return channel 60. The first three-way valve assembly 58 has a first state in which fluid is channeled to the fluid outlet 20 of the fluid channel 16 and a second state in which the fluid is diverted from the fluid channel 16 via the second outlet to the return channel 60. Additionally, the assembly 10 includes a water supply channel 66 including a controllable water valve 68. The water supply channel 66 is connected to the fluid channel 16 at a point upstream from the pump 24. The assembly 10 also comprises a cleaning reservoir 56 in which a downstream end of the return channel 60 emanates. An electronic controller assembly 72 is provided to control at least the pump 24, the flow-through heating unit 26, the first three-way valve assembly 58 and optionally also the controllable water valve 68 and a controllable fluid valve 70 which is mounted in the fluid channel 16 upstream of the point at which the water supply channel 66 is connected to the fluid channel 16. In this embodiment, the electronic controller assembly 72 is configured to operate the assembly in a production mode and in a cleaning mode. In the production mode, the fluid inlet 18 of the fluid channel 16 is supplied with fluid to be frothed that is present in the fluid reservoir 46. During production mode, the controllable water valve 68 will be closed and the controllable fluid valve 70 will be open. During at least part of the cleaning mode, the fluid inlet 18 of the fluid channel is supplied with cleaning fluid. To that end the fluid inlet 18 of the fluid channel may be connected to the cleaning reservoir 56, for example by taking the fluid inlet 18 out of the fluid reservoir 46 and inserting the fluid inlet 18 into the cleaning reservoir 56. This has the advantage that the fluid inlet 18, for example embodied as a dipping tube, is cleaned both on the inside and the outside thereof. The cleaning reservoir 56 may be filled with water by switching the controllable water 68 into the opened state and by switching the first three-way valve assembly 58 in the second state so that water is channeled via water supply channel 68, fluid channel 16, return channel 60 to cleaning reservoir 56. After the cleaning reservoir 56 is filled with water and optionally some cleaning agent in fluid or tablet form, the water controllable valve 68 may be closed and the fluid valve 70 may be opened so that recirculation of fluid though the fluid channel 16, return channel 60 and cleaning reservoir 56 is obtained as long as the pump 24 is pumping. The cleaning mode may also include a pre-rinse action in which water supplied via the water supply channel 66 removes any residual milk from the fluid channel 16 and the components therein, for example, because the first three-way valve 58 is first kept in the first state so that the water/milk-fluid is removed via the fluid outlet 20. The cleaning operation may also involve heating the water during the recirculation so that any bacteria in the system may be killed.

In an embodiment, that includes a water supply channel 66 with a controllable water valve 68, the assembly 10 may include a second three-way valve assembly 62. The adjective "second" should not be construed to imply that there always has to be a first three-way valve assembly 58 as well. The adjectives "first" and "second" are used herein to indicate the different functions of these two three-way valves. In other words, the invention includes an embodiment with only a first three-way valve 58, an embodiment with only a second three-way valve 62 and an embodiment with both a first and a second three-way valve 58, 62.

In the embodiments having a second three-way valve 62, the three-way valve has an inlet via which the second three-way 62 is connected or connectable to the flow-through heating unit 26. The second three-way valve 62 has a first outlet and a second outlet. The first outlet connects the second three-way valve 62 to a fluid drain 64. Depending on the further embodiments, the second outlet may be connected to the fluid outlet 20 or to the return channel 60 which has been described before in relation to an embodiment of the assembly 10 having a cleaning reservoir 56. Anyway, the second three-way valve assembly 62 has a first state in which fluid coming from the flow-through heating unit 26 is channeled to the fluid drain 64. In a second state of the second three-way valve 62 fluid coming from the flow-through heater 26 is channeled to the second outlet of the second three-way valve assembly 58. The assembly 10 additionally includes an electronic controller assembly 72 that is configured to bring the assembly 10 in a flow-through heating unit cooling mode in which controllable water valve 68 is in an open state and the second three-way valve assembly 62 is in the first state so that water is channeled through the flow-through heating unit 26 to the fluid drain 64. By virtue of the relatively cold water, any heat present in the heater or the downstream fluid line can be quickly removed by the water that is channeled through these parts.

In a further embodiment, the second three-way valve assembly 62 may be mounted in the fluid channel 16. This embodiment is not shown in the figures. In that further embodiment, the second outlet of the second three-way valve assembly 62 is connected to a downstream part of the fluid channel 16 leading to the fluid outlet 20. The electronic controller assembly 72 is configured to bring the second three-way valve 62 in the second state when the assembly is in a production mode so that fluid coming from the flow-through heating unit 26 is channeled to the fluid outlet 20.

In an alternative further embodiment, which also includes a return channel 60, a cleaning reservoir 56 and an electronic controller assembly 72 that is configured to operate the assembly 10 in a production mode and a cleaning mode, the second three-way valve assembly 62 may be mounted in the return channel 60. An example of this embodiment is shown in FIG. 1. The inlet of the second three-way valve assembly 62 is then connected to the flow-through heating unit 26 via an upstream part of the return channel 60 when the first three-way valve 58 is in the second state. The second outlet of the second three-way valve assembly 62 is connected to a downstream part of the return channel 60 that emanates in the cleaning reservoir 56. The electronic controller assembly 72 is configured to bring the first three way valve assembly 58 in the second state when the assembly 10 is in the flow-through heating unit cooling mode so that water coming from the flow-through heating unit 26 is channeled from the first three-way valve 58 via the upstream part of return channel 60 to the inlet of the second three-way valve 62 and subsequently to the fluid drain 64. The electronic controller assembly 72 is configured to bring the second three way valve 62 in the second state during the cleaning mode of the assembly so that water coming from the flow-through heating unit 26 is channeled via the first three-way valve 58, the upstream part of the return channel 60, the second three-way valve 62 and the downstream part of the return channel 60 to the cleaning reservoir 56.

Figure 2:
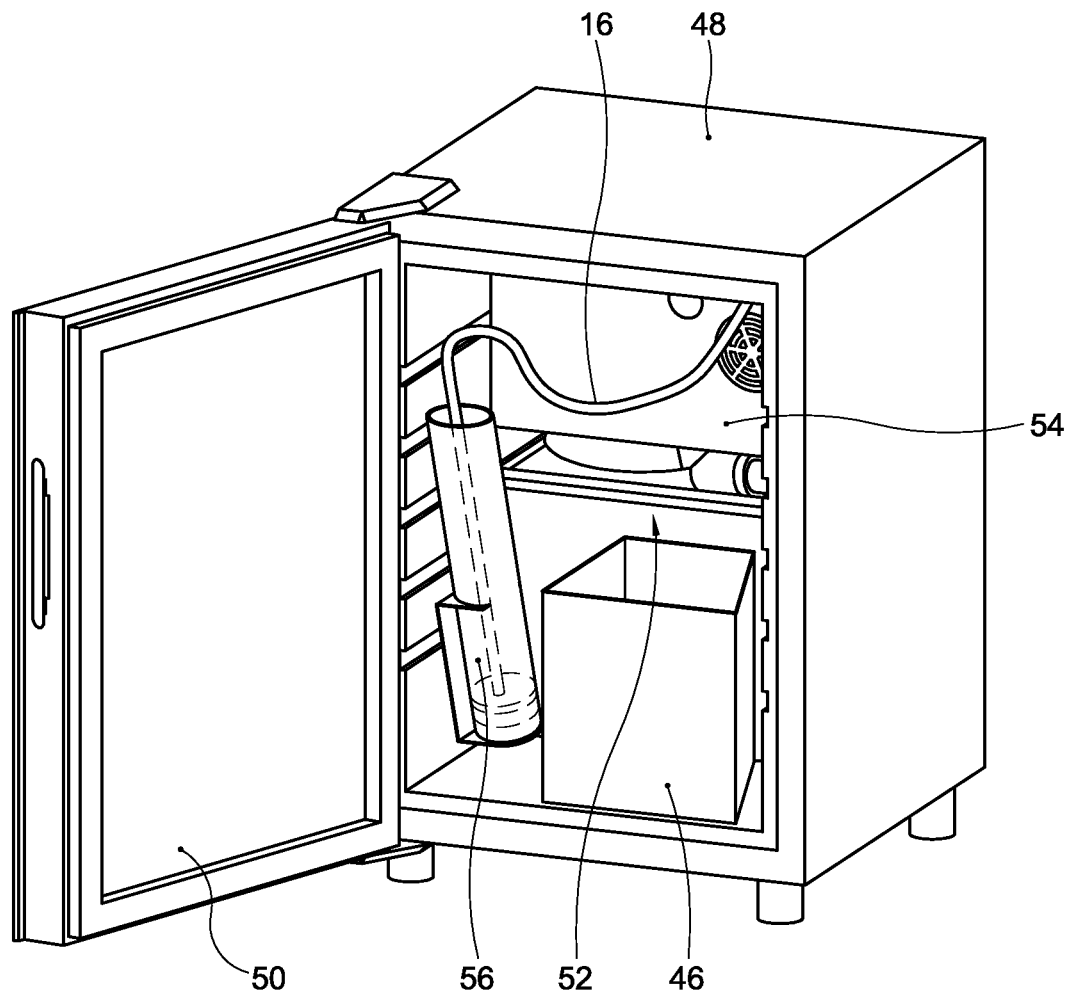
FIG. 2 shows an example of a refrigerator in which an assembly for frothing is mounted.

The invention also comprises a refrigerator, of which an example is shown in FIG. 2. In most general terms, the refrigerator includes a housing 48 bounding a refrigerator space 52. The housing includes a door 50 that has an open position in which the refrigerator space 52 is accessible via a door opening and a closed position for closing off the door opening. The refrigerator also includes the assembly 10 for frothing milk according to the invention. The major components of the assembly 10, including the frothing unit 22 and the flow-through heating unit 26 are positioned in the refrigerator space 52.

The advantages of the refrigerator according to the invention have been provided in the summary, to which reference is made. FIG. 2 shows an example of a refrigerator according to the invention, in which the refrigerator is a table-size model that can for example be integrated in a standard cupboard, can be placed under a standard sink or that can be placed adjacent to an existing coffee machine. In general, any refrigerator may be used for holding the assembly 10.

In an embodiment, of which an example is shown in FIG. 2, the assembly 10 may comprise a component tray 54 that is removably mounted in the refrigerator space 52. The component tray 54 may be removable from the refrigerator space 52 in the open position of the door 50. The component tray 54 may support at least the pump 24, the frothing unit 22, the heating unit 26 and at least part of the fluid channel 16.

By positioning at least the major components 22, 24, 26 of the assembly 10 on a removable component tray 52, maintenance of the assembly 10, including for example replacement of damaged or worn-out parts, is relatively simple. In addition, the components 22, 24, 26 of the assembly 10 may be positioned in an optimal manner on the component tray, such that the available refrigerator space 52 is used in an optimal way. As a result, the refrigerator space 52 may for example be used for storage of multiple milk reservoirs/packages or even for additional products that require cooling. Several techniques can be used to mount the component tray 52 in the refrigerator. Preferably, the component tray 52 is slidably mounted on rails, gliders or similar to facilitate the removal out of and into the refrigerator space.

In an embodiment, of which an example is shown in FIG. 2, and in which the assembly is provided with a fluid reservoir 46, the fluid reservoir 46 may be removably positioned in the refrigerator space 52. The position of the fluid reservoir 46 may be such that the fluid reservoir 46 is removable from the housing space 52 without removing any other assembly component from the housing 48.

A removable fluid reservoir 46 facilitates rapid switching of a depleted reservoir with a new reservoir filled with milk. In the event a preformed, refillable reservoir is used, a removable reservoir has the advantage that it can more easily be refilled by a user, for example outside of the refrigerator. Preferably, the reservoir is positioned near the refrigerator door 50 and in front of the component tray 52, so that it can be removed without having to remove the component tray 52.

The invention also provides a system for making coffee, comprising an apparatus for providing coffee to a user and an assembly 10 or a refrigerator according the invention. The coffee apparatus and the assembly are connected to form an integrated unit. The integrated unit may be provided with an integrated electronic control system that is operable by means of a user interface that is provided on the coffee apparatus. In an embodiment, the user interface may be a graphical user interface (GUI).

The advantages of the system for making coffee have been described in the summary, to which reference is made.

The invention also provides a method for producing frothed milk. The method comprises providing an assembly or a refrigerator according to the invention and activating the pump 24 to create a flow of milk in the fluid channel 16. In addition, the method comprises supplying a flow of air to the milk in the fluid channel 16, mixing the flow of milk and the flow of air to form a milk/air-mixture and frothing the milk/air mixture in the frothing unit 22 to form frothed milk. The method also includes selectively heating or not heating the frothed milk by the flow-through heating unit 26 and dispensing the frothed milk via the fluid outlet 20.

The advantages of the method for frothing milk have been described in the summary, to which reference is made.

Finally, the invention relates to the use of a thick-film-flow-through heating unit 26 in an assembly for producing frothed milk. The assembly comprises a fluid channel 16 including a frothing unit 22 that is positioned upstream of the thick-film-flow-through heating unit 26 which is also included in the fluid channel 16. The thick-film-flow-through heating unit 26 comprises a thick-film heating element 28. The thick-film-flow-through heating unit 26 bounds a heating unit fluid channel 30 that is a part of the fluid channel 16 of the assembly. A frothed milk/air-mixture is directed through the heating unit fluid channel 30 and is selectively heated or not heated respectively by supplying electric power or by not supplying electric power to the thick-film-flow-through heating unit 26.

The advantages of the use of a thick-film-flow-through heating unit for producing frothed milk have been described in the summary, to which reference is made.

The descriptions above are intended to be illustrative, not limiting. Thus, it will be apparent to one skilled in the art that modifications may be made to the invention as described in the foregoing without departing from the scope of the claims set out below. Various embodiments may be applied in combination or may be applied independently from one another. Reference numbers used in the above detailed description are not intended to limit the description of the embodiments to the examples shown in the figures. The figures just represent examples and the embodiments may be embodied in other ways than the specific way shown in the examples of the drawings.

LEGEND

10—assembly for frothing milk
12—air channel
12a—air inlet channel
12b—downstream end of air channel
14—controllable air valve
16—fluid channel
16a—air inlet emanation point
18—fluid inlet
20—fluid outlet
22—frothing unit
24—pump
26—thick-film-flow-through heating unit
28—thick film heating element
28a—metal heat conductive plate
28b—di-electric coating
28c—electrically conductive track
29—second plate
30—heating unit fluid channel
46—fluid reservoir
48—housing
50—door
52—refrigerator space
54—component tray
56—cleaning reservoir
58—first three-way valve
60—recycle channel
62—second three-way valve
64—discharge
66—water supply channel
68—controllable water valve
70—controllable fluid valve
72—electronic controller assembly

What is claimed is:

1. An assembly for frothing milk, including:
an air supply assembly including an air source and an air channel having an air inlet and a downstream end, the air source being connected to the air inlet;
a fluid channel extending from a fluid inlet to a fluid outlet, the fluid channel subsequently including:
an air inlet emanation point to which the downstream end of the air channel is connected;
a frothing unit including a pump; and
a flow-through heating unit that bounds a heating unit fluid channel that is a part of the fluid channel, wherein the flow-through heating unit has an powered state and a non-powered state, wherein the flow-through heating unit has a thermal mass which is such that, when the heating unit is in the non-powered state, an amount of 40-60 ml frothed milk with a temperature of less than 7° C. at the fluid inlet, remains below a temperature of 20° C. when it has passed through the flow-through heating unit fluid channel merely 10 s after the flow-through heating unit has been switched from the powered state for producing hot frothed milk to the non-powered state for producing cold frothed milk.

2. The assembly according to claim 1, wherein the flow-through heating unit is a thick-film-flow-through heating unit including a thick-film heating element.

3. An assembly according to claim 2, wherein the thick-film heating element includes a metal heat conductive plate which on a first side is coated with a di-electric coating on which a track of electrically conductive material is applied having an electrical resistance so that heat is generated by the track when an electric current flows through the track of electrically conductive material.

4. An assembly according to claim 3, wherein the thick-film-flow-through heating-unit includes a second plate that is connected with a contact side thereof to a second side of the metal plate, wherein the second plate includes a channel structure that has an open side at the contact side and wherein the first plate closes off the open side of the channel structure so as to bound the heating unit fluid channel.

5. The assembly according to claim 1, further comprising an electronic controller assembly controlling the flow-through heating unit in response to at least a user-generated instruction.

6. The assembly according to claim 1, wherein the heating unit fluid channel has a meandering and/or spiral-shaped configuration.

7. The assembly according to claim 1, wherein the thick-film-flow-through heating unit has a power output that is between 800 W<P<2.400 W.

8. The assembly according to claim 1, further comprising a fluid reservoir for holding milk to be frothed, wherein the fluid inlet is removably inserted in or at least removably connected to the fluid reservoir.

9. The assembly according to claim 1, further comprising:
a first three-way valve assembly disposed in the fluid channel downstream of the flow-through heating unit having:
an inlet that connects the first three-way valve via the fluid channel to the flow-through heating unit;
a first outlet that connects the first three-way valve to the fluid outlet of the fluid channel;

a second outlet that connects the first three-way valve to a return channel;

wherein the first three-way valve assembly has a first state in which fluid is channeled to the fluid outlet of the fluid channel and a second state in which the fluid is diverted from the fluid channel via the second outlet to the return channel;

a water supply channel including a controllable water valve, the water supply channel being connected to the fluid channel at a point upstream from the pump;

a cleaning reservoir in which a downstream end of the return channel emanates;

an electronic controller assembly configured to control at least the pump, the flow-through heating unit, and the first three-way valve assembly, wherein the electronic controller assembly is configured to operate the assembly in a production mode and in a cleaning mode, wherein, in the production mode, the fluid inlet of the fluid channel is supplied with fluid to be frothed and wherein, during at least part of the cleaning mode, the fluid inlet of the fluid channel is supplied with cleaning fluid.

10. The assembly according to claim 1, further comprising:

a water supply channel including a controllable water valve, the water supply channel being connected to the fluid channel at a point upstream from the pump;

a second three-way valve assembly having:
an inlet via which the second three-way is connected or connectable to the flow-through heating unit;
a first outlet that connects the second three-way valve to a fluid drain; and
a second outlet;
wherein the second three-way valve assembly has a first state in which fluid coming from the flow-through heating unit is channeled to the fluid drain a second state in which fluid coming from the flow-through heater is channeled to the second outlet of the second three-way valve assembly;

wherein the assembly additionally includes:
an electronic controller assembly that is configured to control the bring the assembly in a flow-through heating unit cooling mode in which controllable water valve in an open state and the second three-way valve assembly is in the first state so that water is channeled through the flow-through heating unit to the fluid drain.

11. The assembly according to claim 10, wherein the second three-way valve assembly is mounted in the fluid channel, wherein the second outlet of the second three-way valve assembly is connected to a downstream part of the fluid channel leading to the fluid outlet, wherein the electronic controller assembly is configured to bring the second three-way valve in the second state when the assembly is in a production mode so that fluid coming from the flow-through heating unit is channeled to the fluid outlet.

12. The assembly according to claim 10, further comprising:

a first three-way valve assembly disposed in the fluid channel downstream of the flow-through heating unit having:
an inlet that connects the first three-way valve via the fluid channel to the flow-through heating unit;
a first outlet that connects the first three-way valve to the fluid outlet of the fluid channel;
a second outlet that connects the first three-way valve to a return channel;

wherein the first three-way valve assembly has a first state in which fluid is channeled to the fluid outlet of the fluid channel and a second state in which the fluid is diverted from the fluid channel via the second outlet to the return channel;

a water supply channel including a controllable water valve, the water supply channel being connected to the fluid channel at a point upstream from the pump;

a cleaning reservoir in which a downstream end of the return channel emanates;

an electronic controller assembly configured to control at least the pump, the flow-through heating unit, and the first three-way valve assembly, wherein the electronic controller assembly is configured to operate the assembly in a production mode and in a cleaning mode, wherein, in the production mode, the fluid inlet of the fluid channel is supplied with fluid to be frothed and wherein, during at least part of the cleaning mode, the fluid inlet of the fluid channel is supplied with cleaning fluid;

wherein the second three way valve assembly is mounted in the return channel and wherein the inlet of the second three-way valve assembly is connected to the flow-through heating unit via an upstream part of the return channel when the first three-way valve is in the second state, wherein the second outlet of the second three-way valve assembly is connected to a downstream part of the return channel that emanates in the cleaning reservoir, and wherein the electronic controller assembly is configured to bring the first three way valve assembly in the second state when the assembly is in the flow-through heating unit cooling mode so that water coming from the flow-through heating unit is channeled from the first three-way valve via the upstream part of the return channel to the inlet of the second three-way valve and subsequently to the fluid drain, and wherein the electronic controller assembly is configured to bring the second three-way valve in the second state during the cleaning mode of the assembly so that water coming from the flow through heating unit is channeled via the first three-way valve, the upstream part of the return channel, the second three-way valve and the downstream part of the return channel to the cleaning reservoir.

13. A method for producing frothed milk, the method comprising:

using a thick-film-flow-through heating unit in an assembly for producing frothed milk, the assembly comprising a fluid channel including a frothing unit that is positioned upstream of the thick-film-flow-through heating unit which is also included in the fluid channel, the thick-film-through-flow heating unit comprising a thick-film heating element, wherein the thick-film-flow-through heating unit bounds a heating unit fluid channel that is a part of the fluid channel of the assembly, directing a frothed milk/air-mixture through the heating unit fluid channel and selectively heating or not heating the frothed milk/air-mixture respectively by supplying electric power or by not supplying electric power to the thick-film-flow-through heating unit.

\* \* \* \* \*